(12) United States Patent
Duta et al.

(10) Patent No.: US 9,620,110 B2
(45) Date of Patent: Apr. 11, 2017

(54) SPEECH RECOGNITION SEMANTIC CLASSIFICATION TRAINING

(71) Applicant: Nuance Communications, Inc., Burlington, MA (US)

(72) Inventors: Nicolae Duta, Winchester, MA (US); Réal Tremblay, Outremont (CA); Andrew D. Mauro, Montreal (CA); S. Douglas Peters, Pointe-Claire (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/262,919

(22) Filed: Apr. 28, 2014

(65) Prior Publication Data
US 2016/0140957 A1 May 19, 2016

Related U.S. Application Data

(63) Continuation of application No. 12/460,249, filed on Jul. 15, 2009, now Pat. No. 8,781,833.
(Continued)

(51) Int. Cl.
*G10L 15/06* (2013.01)
*G10L 15/18* (2013.01)
(Continued)

(52) U.S. Cl.
CPC .......... *G10L 15/1815* (2013.01); *G10L 15/01* (2013.01); *G10L 15/063* (2013.01);
(Continued)

(58) Field of Classification Search
CPC .......... G06F 17/2785; G06F 17/30705; G06F 17/30038; G06F 17/30265; G10L 15/1822;
(Continued)

(56) References Cited

U.S. PATENT DOCUMENTS 7,092,888 B1 * 8/2006 McCarthy ............ G10L 15/063
379/88.01
7,149,687 B1 12/2006 Gorin et al.
(Continued)

*Primary Examiner* — Huyen Vo
(74) *Attorney, Agent, or Firm* — Hamilton, Brook, Smith & Reynolds, P.C.

(57) ABSTRACT

An automated method is described for developing an automated speech input semantic classification system such as a call routing system. A set of semantic classifications is defined for classification of input speech utterances, where each semantic classification represents a specific semantic classification of the speech input. The semantic classification system is trained from training data from training data substantially without manually transcribed in-domain training data, and then operated to assign input speech utterances to the defined semantic classifications. Adaptation training data based on input speech utterances is collected with manually assigned semantic labels from at least one source of already collected language data. When the adaptation training data satisfies a pre-determined adaptation criteria, the semantic classification system is automatically retrained based on the adaptation training data.

21 Claims, 9 Drawing Sheets
(6 of 9 Drawing Sheet(s) Filed in Color)

Related U.S. Application Data

(60) Provisional application No. 61/135,136, filed on Jul. 17, 2008.

(51) Int. Cl.
*G10L 15/01* (2013.01)
*G10L 15/183* (2013.01)

(52) U.S. Cl.
CPC ........ *G10L 15/1822* (2013.01); *G10L 15/183* (2013.01); *G10L 2015/0636* (2013.01)

(58) Field of Classification Search
CPC ..... G10L 15/063; G10L 15/183; G10L 15/01; G10L 15/02; G10L 15/1815; G10L 15/20
USPC .............. 704/1–10, 250, 251, 255, 257, 270
See application file for complete search history.

(56) References Cited

U.S. PATENT DOCUMENTS

| | | | |
|---|---|---|---|
| 7,813,926 | B2 | 10/2010 | Wang et al. |
| 7,856,351 | B2 * | 12/2010 | Yaman ................ G10L 15/1815 704/251 |
| 8,321,220 | B1 * | 11/2012 | Chotimongkol ...... G10L 15/063 704/10 |
| 8,781,833 | B2 | 7/2014 | Duta et al. |
| 2006/0190253 | A1 | 8/2006 | Hakkani-Tur et al. |
| 2007/0239430 | A1 | 10/2007 | Ollason |

* cited by examiner

SPEECH RECOGNITION SEMANTIC CLASSIFICATION TRAINING

This application is a continuation of U.S. patent application Ser. No. 12/460,249, filed Jul. 15, 2009, which in turn claims priority from U.S. Provisional Patent Application 61/135,136, filed Jul. 17, 2008, all of which are incorporated herein by reference.

FIELD OF THE INVENTION

The present invention relates to semantic classification applications, and more specifically, to the training of semantic classification applications such as call routers.

BACKGROUND ART

Spoken language understanding systems have been deployed in numerous applications which require some sort of interaction between humans and machines. Most of the time, the interaction is controlled by the machine which asks questions of the users and then attempts to identify the intended meaning from their answers (expressed in natural language), and then takes action in response to these extracted meanings.

One important class of applications employs Natural Language Understanding (NLU) technology for a type of semantic classification known as "call routing," whose goal is to semantically classify a telephone query from a customer to route it to an appropriate set of service agents based on a brief spoken description of the customer's reason for the call. Call routing systems reduce queue time and call duration, thereby saving money and improving customer satisfaction by promptly connecting the customer to the right service representative in large call centers.

Determining a semantic classification for a human utterance in a call routing system is typically a five-step process as illustrated by FIG. 1. Input speech from the caller is translated into a text string by an Automated Speech Recognition (ASR) Module 101. The ASR text is output into an NLU semantic classification component known as a Statistical Router 102. The Statistical Router 102 models the NLU task as a statistical classification problem in which the ASR text corresponding to an utterance is assigned to one or more of a set of predefined user intents, referred to as "call routes." Various specific classifiers have been compared in the literature with similar performance (1-2% differences in classification accuracy), including, for example, Boosting, Maximum Entropy (ME), and Support Vector Machines (SVM). For example, Statistical Router 102 may use binary unigram features and a standard back-propagation neural network as a classifier.

The Statistical Router 102 typically has an unacceptably high error rate (10-30% classification error rates are commonly reported in deployed applications), and thus a rejection mechanism is implemented to only retain those route hypotheses which are most likely to be correct. The rejection decision should not be based only on the confidence in the classification of the Statistical Router 102 because the ASR Module 101 can also make recognition errors which should be taken into account. Therefore, another separate classifier—Confidence Engine (CE) 103—is used to produce confidence scores based on both acoustic and NLU features to determine the highest ranked N hypotheses (typically 35) output from the Statistical Router 102. A Route Reordering Component 104 then reorders the route hypotheses according to their overall confidence as determined by the CE 103.

The best scoring route hypothesis is sent to Threshold Decision Module 105 which accepts the hypothesis if its confidence score is above an accept threshold. The value of the accept threshold is chosen so that the system satisfies one or more operating constraints such as an upper bound on the False Accept Rate (FAR) (typically 1-5%).

The performance of a semantic classification system such as a call router is usually derived from its Receiver Operating Characteristic (ROC) curve. The ROC plots the False Accept Rate (FAR), the percentage of incorrectly routed calls whose confidence scores exceed the accept threshold, against the Correct Accept Rate (CAR), the percentage of correctly routed calls whose confidence scores exceed the threshold, at various thresholds. An Automation Rate (AR) is computed as the percentage of calls which are automatically routed by the system (FAR+CAR) at a given operating point (confidence threshold) and is one of the main system parameters considered when deploying a call routing system. The rejection component has rarely been mentioned in recent call routing literature, in which most studies focus on methods to improve the accuracy of Statistical Router 102 and simplify its training. As a consequence, there is no existing discussion on the actual effectiveness of a call routing system as measured by its Automation Rate.

SUMMARY OF THE INVENTION

Embodiments of the present invention are directed to automated computer based methods implemented using at least one hardware implemented processor for developing an automated speech input semantic classification system such as a call routing system; as well as automated systems for performing such methods that include at least one processor and a memory device operatively connected to the at least one hardware implemented processor, wherein, responsive to execution of program instructions accessible to the at least one hardware implemented processor, the at least one hardware implemented processor is configured to perform the automated methods; as well as a computer program product encoded in a non-transitory computer-readable medium, which when executed by a computer causes the computer to perform the automated methods. A set of semantic classifications is defined for classification of input speech utterances, where each semantic classification represents a specific semantic classification of the speech input. The semantic classification system is trained from training data from training data substantially without manually transcribed in-domain training data, and then operated to assign input speech utterances to the defined semantic classifications. Adaptation training data based on input speech utterances is collected with manually assigned semantic labels from at least one source of already collected language data. When the adaptation training data satisfies a pre-determined adaptation criteria, the semantic classification system is automatically retrained based on the adaptation training data.

In further specific embodiments, training a semantic classification system such as a call router may include training a language model in an automatic speech recognition engine that converts the input speech utterances into representative text. Training the semantic classification system also may include training a statistical semantic classifier such as a call router that classifies text representing the input speech utterances according to one of the defined semantic classifications ("call routes"). And training the semantic classification system may include training a confidence engine that determines confidence scores based on acoustic features and natural language understanding (NLU) features to represent the likelihood of the input speech utterances being correctly classified with a defined classification. The training data may include in-domain automatically transcribed training data, or manually transcribed training data from one or more other semantic classification systems.

Embodiments of the present invention are also directed to a method of automated training for a semantic classification system such as a call router that starts by performing first-pass recognition of available training data using an initial language model to develop first pass recognition results corresponding to the available training data. The first pass recognition results are divided into multiple first pass subsets. For each first pass subset, a subset language model is developed from the first pass subset recognition results. Second-pass recognition of the first pass subsets is performed using cross-adapted subset language models to develop second pass recognition results corresponding to the available training data. Then a final adapted language model is computed from the second pass recognition results.

In some specific embodiments, the first pass recognition results may be divided into two first pass subsets. The first pass subsets may be approximately equal in size. The initial language model may be a bootstrapped language model. A statistical router may be computed from the second pass recognition results for assigning input speech utterances to predefined semantic classifications.

Embodiments of the present invention are also directed to a method of automated training for a semantic classification confidence engine in a semantic classification system. An under-trained semantic classification system is operated on a set of input speech utterances with manually assigned semantic labels to extract a set of corresponding feature data. Then the confidence engine is trained on the extracted feature data.

In another embodiment, a semantic classification system is operated on a set of input speech utterances with manually assigned semantic labels to extract a set of corresponding feature data. Then the confidence engine for a different semantic classification application is trained on the extracted feature data.

An embodiment also includes a method of automated training for a router confidence engine in a call routing system in which a set of call routes are defined for processing input speech utterances in a call routing system, where each call route represents a specific call processing path. Initial router confidence training is performed based on an initial set of training data. Then the call routing system is operated to assign input speech utterances to the defined call routes. Adaptation training data is collected based on processed input speech utterances, and then router confidence training is re-performed based on the adaptation training data.

An embodiment of the present invention also includes a method of training for an automated call routing system for improving system accuracy at early deployment stages. A set of call routes is defined for processing input speech utterances in a call routing system, where each call route represents a specific call processing path. The call routing system is trained from training data having little or no in-domain manually transcribed training data, and the call routing system is operated to assign input speech utterances to the defined call routes. Adaptation training data is collected based on manually processed input speech utterances, and the call routing system is automatically retrained based on the adaptation training data to improve system accuracy.

In another embodiment, a method for an automated call routing system also improves system accuracy at early deployment stages. A set of call routes is defined for processing input speech utterances in a call routing system. Each call route represents a specific call processing path. The call routing system is trained based on training data processed by a generic confidence engine, and the call routing system is operated to assign input speech utterances to the defined call routes. Adaptation training data is collected based on manually processed input speech utterances, and the call routing system is automatically retrained based on the adaptation training data to improve system accuracy.

An embodiment also includes a method of training for an automated call routing system for improving system accuracy at early deployment stages in which a set of call routes is defined for processing input speech utterances in a call routing system, where each call route represents a specific call processing path. The call routing system is trained based on training data processed by a generic confidence engine using little or no in-domain manually transcribed training data, and then the call routing system is operated to assign input speech utterances to the defined call routes. Adaptation training data is collected based on manually processed input speech utterances, and the call routing system is automatically retrained based on the adaptation training data to improve system accuracy.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

DETAILED DESCRIPTION OF SPECIFIC EMBODIMENTS

Various embodiments of the present invention are directed to techniques for building a semantic classification system such as a call router which uses few or no manual transcriptions of in-domain audio data. This helps make development of semantic classification systems cost- and time-effective for deployment in smaller applications. It also avoids the cost of manual annotation of the audio data and decreases the amount of manual work needed and implicitly the deployment time to start operating a given new system.

Training a semantic classification application such as a call router is typically based on two sets of manual annotations of the customer spoken utterances. The first set of annotations, called transcriptions, denote the text corresponding to the spoken waveforms and is used to train the Language Model (LM) used in the ASR system as well. In call routing, most error percentages are computed of the total number of calls handled by the system. The second set of annotations, called semantic labels, concerns the customer's intent and is used to train the router and confidence engine (CE). One challenge is minimizing the manual effort needed for transcribing and labeling the audio training data. Embodiments of the present invention are directed to a semantic classification system such as a call router which can train itself and uses few or no manual transcriptions of the application audio data. This can offer the following advantages over a system which uses manually transcribed training sets:

It is cost and time-effective for deployment in small applications

It avoids the cost of manual annotation of the audio data

It decreases the amount of manual work and implicitly the deployment time

For example, a pseudo code representation of one specific approach might be set forth as follows:

```
Process DevelopSemanticClassification
    define semantic classifications for classification of
        speech input
    train semantic classification system from training data
        without in-domain manually transcribed training data
    operate semantic classification system to assign input
        speech utterances to defined semantic
            classifications
    collect adaptation training data based on input speech
        utterances with manually assigned semantic labels
    IF adaptation training data satisfies pre-determined
        adaptation criteria:
        automatically retrain the semantic classification
            system based on the adaptation training data
    ENDIF
```

Figure 1:
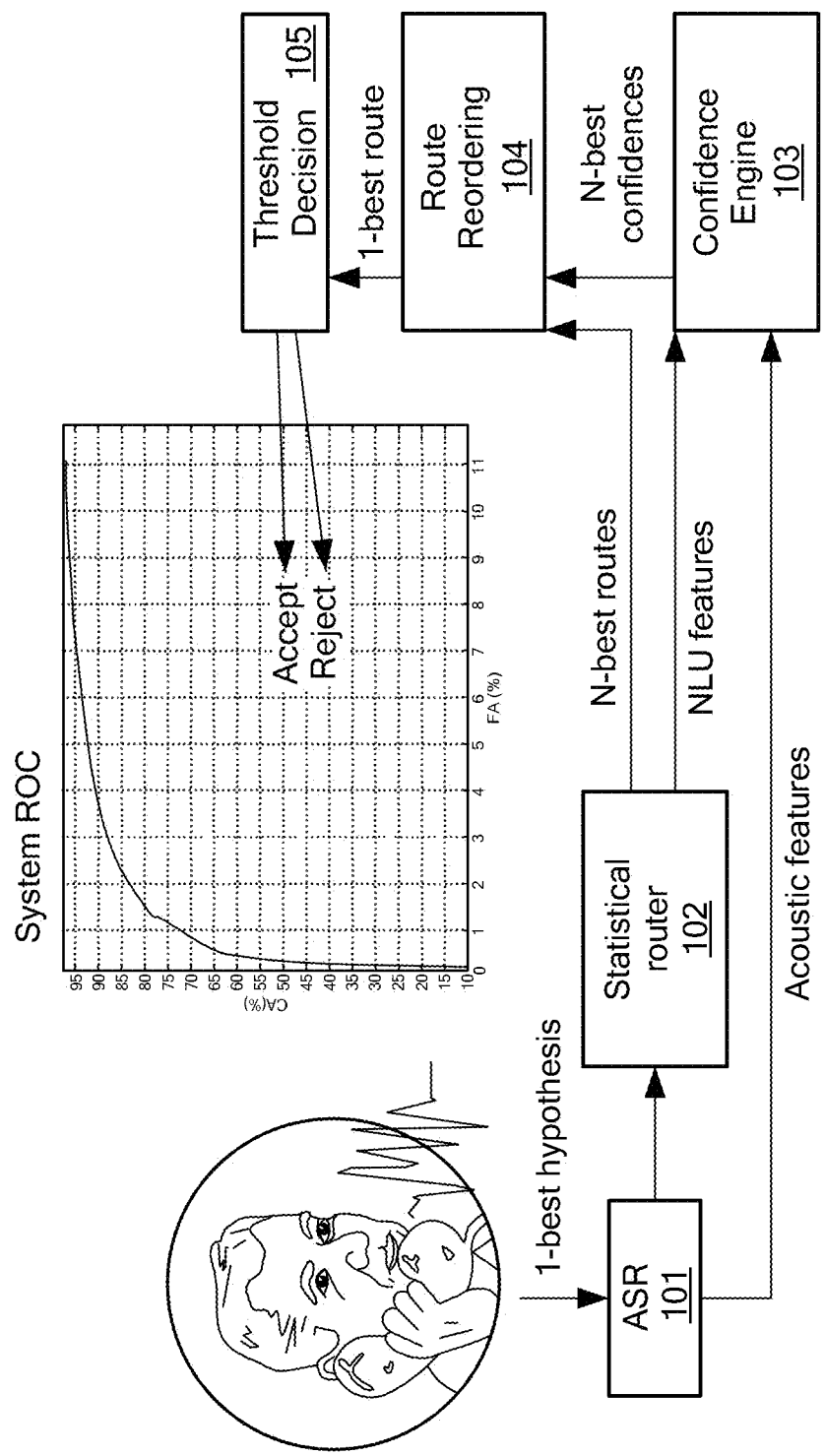
FIG. 1 shows various functional blocks in a typical semantic classification system in the specific form of a call router application.
Figure 2:
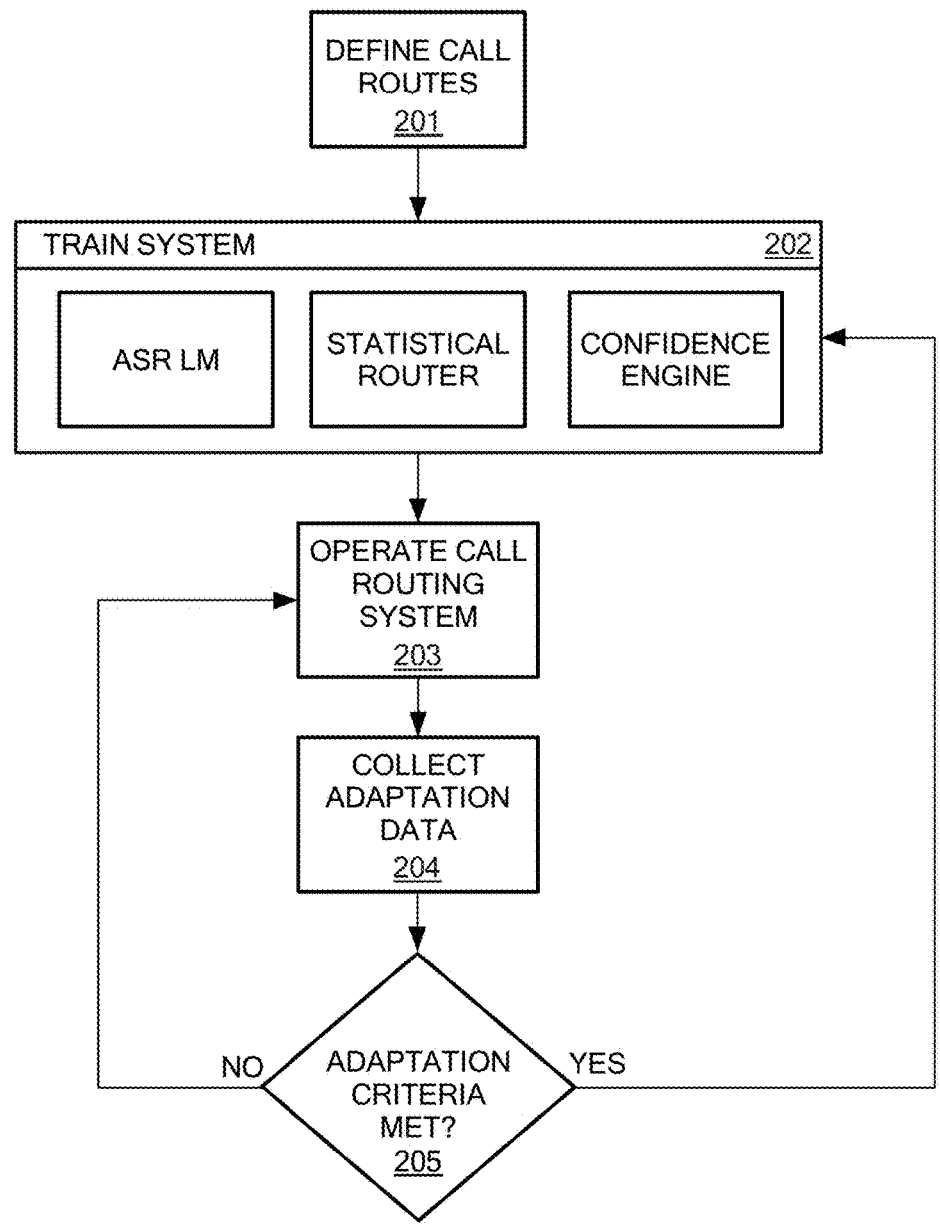
FIG. 2 shows various logical steps in the automated semantic classification training process of one specific embodiment of the present invention.

FIG. 2 shows various logical steps in one specific embodiment of an automated semantic classification training process according to the present invention. First, a set of semantic classifications (e.g., call routes) is defined, step 201, for processing input speech utterances in the system. Each semantic classification represents a specific semantic classification of an input speech utterance. Once the semantic classifications are defined, the system is trained from the available training data, step 202, which includes little or no in-domain manually transcribed training data. For example, the training data may include in-domain automatically transcribed training data, manually transcribed training data from one or more other semantic classification systems, and/or a small amount of in-domain manually transcribed training data. Training of the system specifically may include training a language model, a statistical semantic classifier ("router"), and/or a confidence engine.

Once the initial training is complete, the system is operated to assign input speech utterances to the defined semantic classifications, step 203. While the system operates, adaptation training data is collected based on the processed input speech utterances, step 204. Whenever the adaptation training data satisfies a pre-determined adaptation criteria, the system automatically retrains based on the adaptation training data, step 205.

Figure 3:
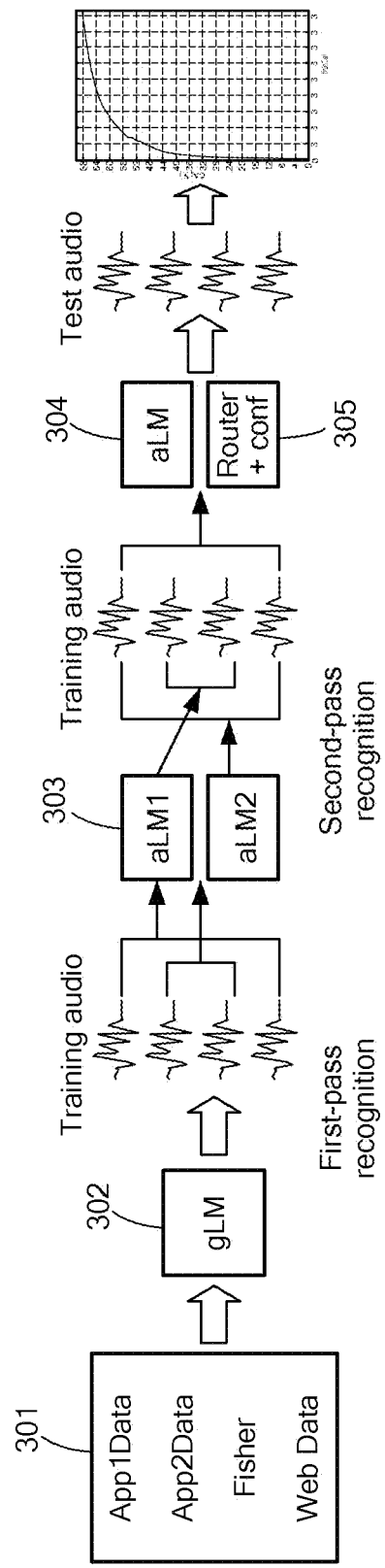
FIG. 3 shows various functional blocks in the automated training of a semantic classification system according to one embodiment for call routing.

More specifically with regards to the training, this may be performed as illustrated in FIG. 3, which shows details of an unsupervised transcription procedure according to one embodiment. The available training data 301 initially may include just a few (1-2 samples per route) manually tagged in-domain samples of the task's audio. Instead, the available training data 301 is mainly based on reusing already collected language data from various sources such as call routing audio and/or manual transcriptions from other companies in the same or similar field, general conversational data, and supplemental web-crawled data from a company's own web site or more generally crawled data from the Internet.

For example, a pseudo code representation of one specific approach might be set forth as follows:

```
Process LanguageModelTraining
    perform first-pass recognition of available training
        data with initial language model
    divide first pass recognition results into first pass
        subsets
    FOR each first pass subset
        develop subset language model from first pass
            subset
            recognition results
    ENDFOR
    perform second-pass recognition of first pass subsets
        using cross-adapted subset language models
    compute final adapted language model from second pass
        recognition results
```

First-pass recognition is performed on the available training data 301 using an initial (possibly generic) language model 302. This may involve ordering the training utterances by duration and dividing them into multiple batches or subsets of roughly equal total duration, thereby placing all the training utterances with matching (or close) transcriptions in the same subset, or at least in adjacent subsets. The batches can be decoded in parallel and require similar processing times.

Figure 4:
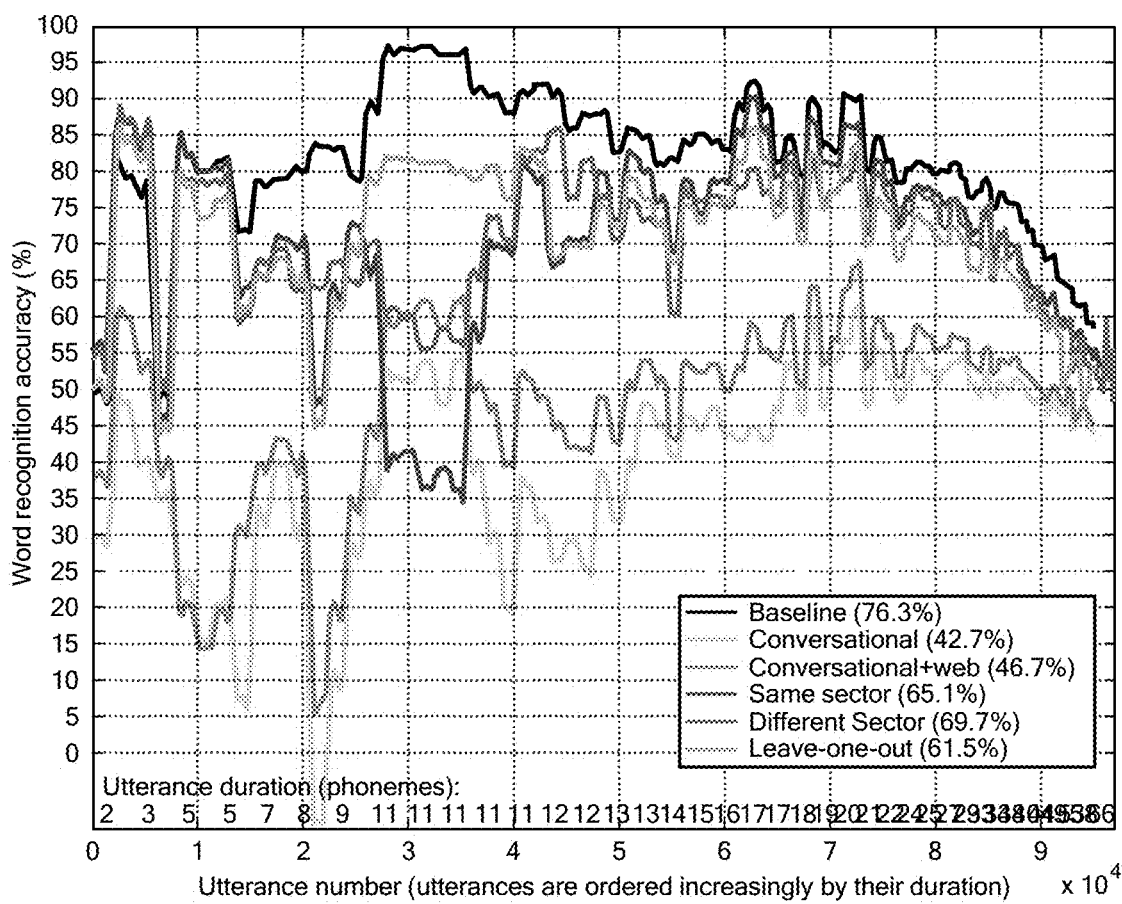
FIG. 4 graphs first-pass word recognition accuracy as a function of utterance duration for experiments involving multiple bootstrapped LMs.

The initial LM for first-pass recognition of the initial training batches may be bootstrapped from the available language data. FIG. 4 shows plots of word recognition accuracy (WRA) first-pass recognition of small batches as a function of utterance duration as performed in various experiments. This makes it easier to detect and analyze the causes of recognition errors such as the effect of the out-of-vocabulary (OOV) words. For example, in FIG. 4, a significant drop in recognition accuracy with respect to the baseline LM occurs on utterances about 8-phonemes long, which corresponds to (duplicate) instances of the OOV word "simpatico." The WRAs corresponding to the bootstrapped LMs are 10-35% (absolute) lower than the baselines and the smallest accuracy drop is obtained when the LM is trained on call routing transcriptions; the call routing LMs make fewer (and different) errors than the conversational LMs on short (1-4 words) utterances since short utterances are very common and better modeled in call routing applications. A graph as in FIG. 4 also reveals the duration distribution and amount of duplication among the training utterances (call routing applications typically have a large number of utterances which correspond to the same text string). Such graphs also may help with designing processing methods that depend on utterance length; for example, if router accuracy is lower on long utterances, it may make sense to reject them right away.

Returning to FIG. 3, the first pass recognition results are divided into multiple first pass subsets; e.g., two first pass subsets. For each first pass subset, a subset language model 303 is developed from the first pass subset recognition results. In FIG. 3, specifically, the utterance batches are divided into two subsets, A1 and A2. Subset A1 contains the shortest and the longest 20% of the utterances, while subset A2 contains the remaining mid-length utterances. In this way, transcription overlap can be minimized between A1 and A2, while each subset can still retain a good representation of the full utterance set.

Figure 5:
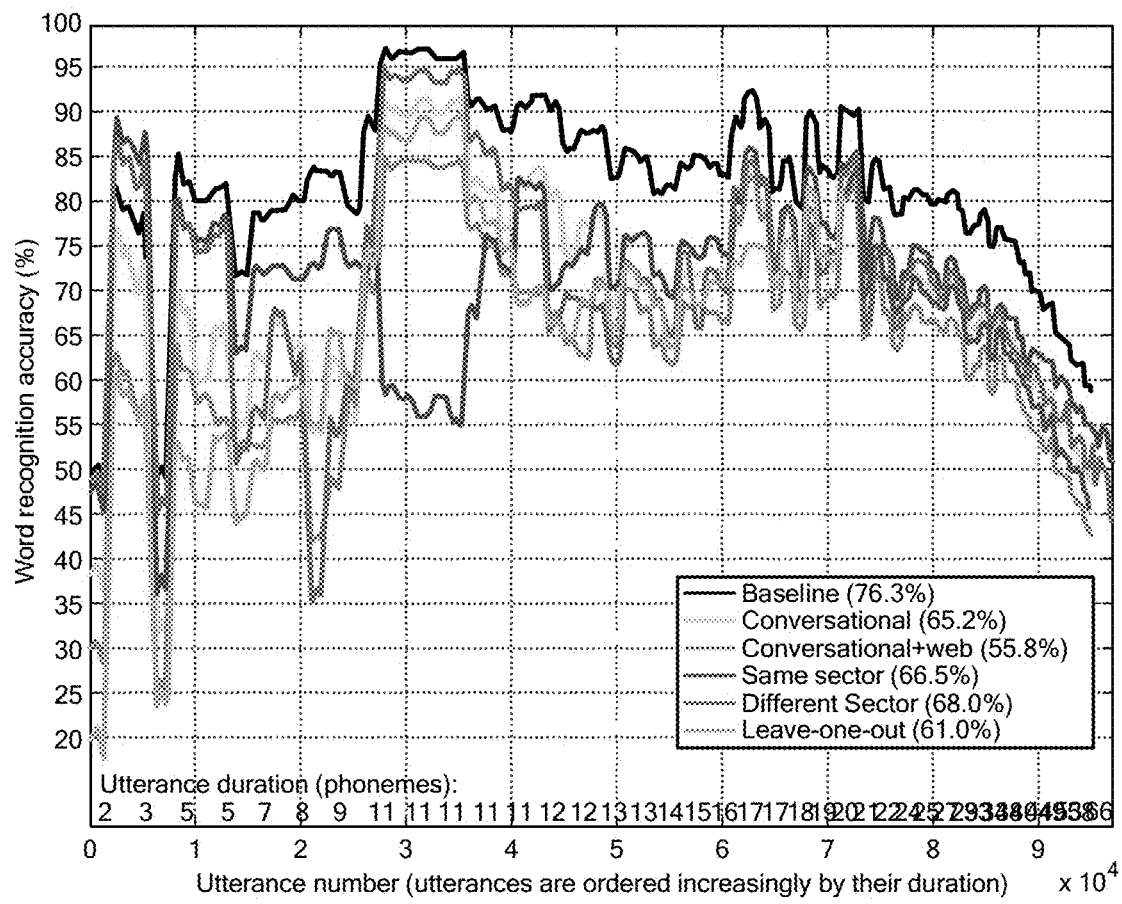
FIG. 5 graphs second-pass word recognition accuracy as a function of utterance duration for multiple adapted LMs.

Second-pass recognition of the first pass subsets is performed using cross-adapted subset language models 303 to develop second pass recognition results corresponding to the available training data. In the specific context of FIG. 3, A1 is recognized using LM2, and A2 is recognized using LM1. The cross-adaptation approach avoids feeding recognition errors from the previous step back into the adaptation process. FIG. 5 graphs second-pass cross-adapted word recognition accuracies for the five adapted LMs from FIG. 4. The accuracy differences corresponding to the second-pass cross-adapted LMs are much reduced with respect to those corresponding to the first-pass bootstrapped LMs, and most WRAs are less than 15% (absolute) lower than the baseline. The second-pass cross-adapted LMs corresponding to bootstrapped LMs based on call routing data are still 5-10% better than the conversational-based LMs.

Then a final adapted language model 304 is computed from the second pass recognition results. Experimental N-gram coverage data of the adapted LMs indicates that the OOV rate may be higher by a factor of two or more with respect to the baseline LM, and by a factor of three or more with respect to the bootstrapped LMs, suggesting that no instance of some words was correctly recognized during the adaptation process, although those words were covered by the bootstrapped LMs at least at the unigram level (for example, the word "attendant" was recognized as "I tend and"). The final lexicon may benefit from being combined with the lexicons used in related call routing applications in order to insure a better word coverage. The lexicon enhancement may benefit most applications with smaller training sets. The WRA on each application's test set were generally 5-15% lower than the baseline.

Figure 6:
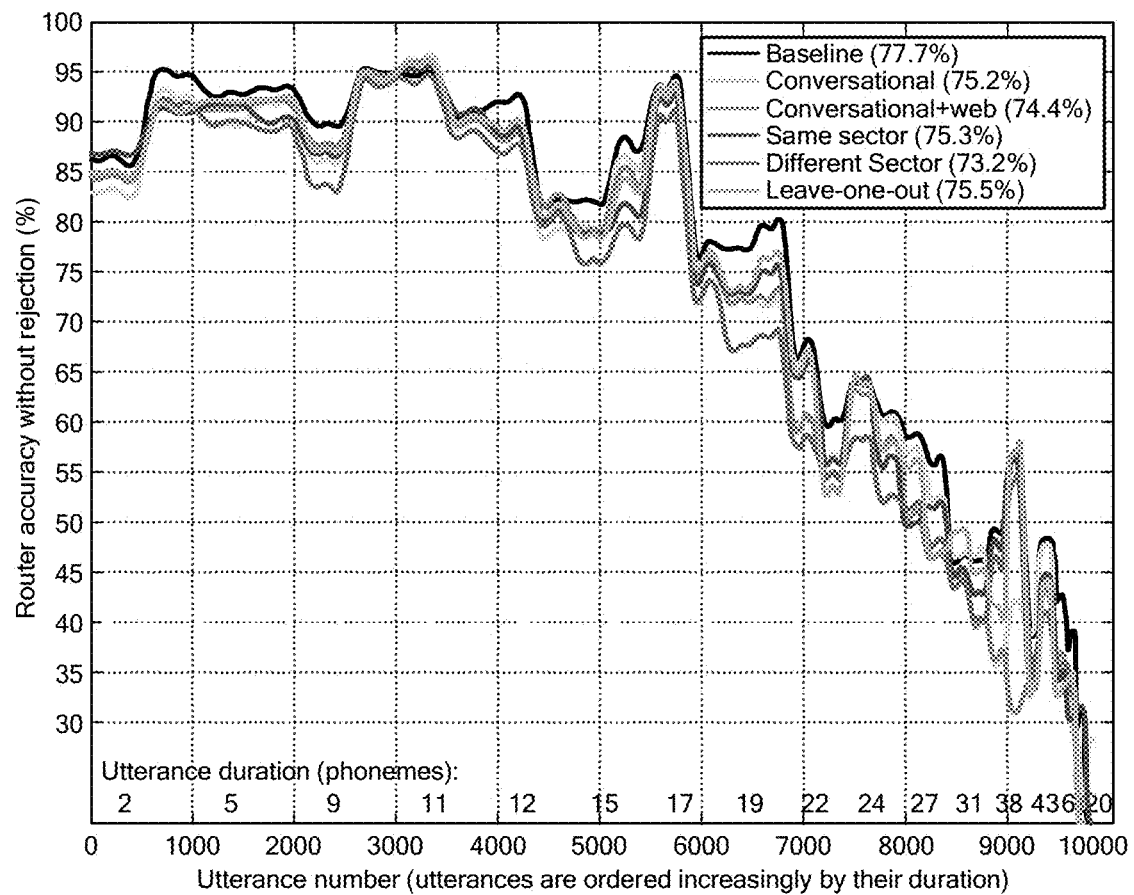
FIG. 6 plots router accuracy as a function of utterance duration for multiple adapted LMs.

A statistical semantic classifier (router) and/or confidence engine 305 also may be computed from the second pass recognition results for assigning input speech utterances to predefined call routes. FIG. 6 shows router accuracy (without rejection) as measured on the experimental applications' test sets. The differences in router accuracy among various adapted LMs are quite small and there is only 2-5% absolute loss compared to the baseline where both the LM and the Router are trained on manual transcriptions. This suggests that WRA is not well correlated and therefore not a good predictor for the router accuracy RA. The best router performance was attained when starting with a bootstrapped LM computed using data from a same-sector application when such data is available. When that is not available, the conversational LM can be used as a starting point. The much lower OOV rate of the text-enhanced conversational LM does not translate into better router accuracy, mostly due to the increase in lexicon size. Performing more adaptation iterations increased the router accuracy only slightly (0.3-0.5%), therefore, depending on the computational resources available, one may decide to stop after a single iteration. However, performing a single recognition pass through the audio generates a relatively large loss in router accuracy although the loss in WRA may be quite small.

As discussed above, a confidence engine based on both acoustic features (e.g. number of frames, number of phones, speech rate) and NLU features (e.g. number of in-domain words, N-best score ratios computed in the route classification process) is used to produce the confidence scores for the router output. This confidence engine is more formally a statistical classifier whose training is based on running the call routing system on a set of manually labeled examples in order to extract the feature vectors used in the training process. Running the call routing system in turn requires a LM for the ASR and a routing model for the router. The routing process is influenced by two error types: errors introduced by the speech recognizer and errors introduced by the router classifier. Thus, training and test methodologies should take into account both these error types. In the early deployment stage of a self-trained routing system, both the LM and the router are likely to be under-trained. Such a system makes more recognition errors and the features on which the confidence is based are likely different from the features extracted by a fully trained system. In this case, a fully trained system denotes a system whose LM and router both are trained on a large amount of manual transcriptions or automated transcriptions with a low WER. In an under-trained system, the LM and router are trained on very small amounts of manual transcriptions and/or larger amounts of automated transcriptions with high WER.

Figure 7:
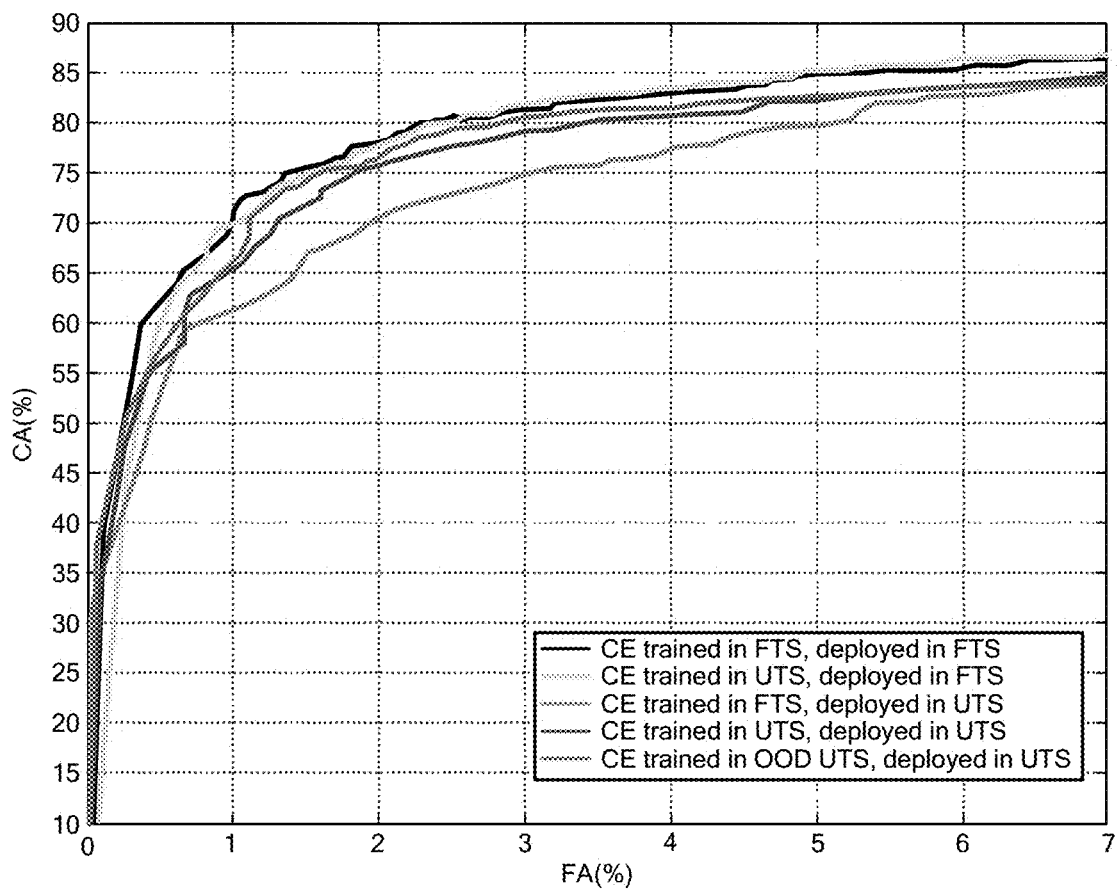
FIG. 7 shows a comparison of system performance corresponding to confidence engine training in fully trained versus under-trained systems.

Among the issues that arise are how significant are the differences in automation rate due to using a CE trained and tested in any combination of fully/under-trained systems, how to train the LM and router used in the confidence training process to maximize the effectiveness of the CE, and also how to train the LM and router used in the confidence testing process such that the reported receiver operating characteristic (ROC) curves are close to those corresponding to a deployed system. FIG. 7 shows a comparison of the ROCs corresponding to call routing systems employing CEs trained and tested in various experimental combinations of fully/under-trained systems. Unsurprisingly, a CE trained and employed in fully trained systems produces the largest automation rates, and also as expected, a CE trained and employed in under-trained systems shows a uniform (valid at most FA rates) loss in automation of about 2-3% (absolute). Less expected is the finding that a confidence engine trained in an under-trained system and employed in a fully trained system shows no significant automation loss with respect to an engine trained in a fully trained system. When deploying a self-trainable routing system, this result allows for training the router confidence engine only once in the first training stage. The subsequent training updates do not have to retrain the CE as this process is computationally intensive. FIG. 7 also shows that a confidence engine trained in a fully-trained system and employed in an under-trained system shows significant automation losses (5-10% absolute) at the FA rates most systems operate in practice (1-5%). And, a confidence engine trained in a fully-trained system of a call routing application from a different domain and employed in a fully trained system shows a 2-3% loss in automation with respect to the case where the training was done on the same application. Therefore, a Universal Confidence Engine (UCE) could be used that is trained on under-trained call routing systems corresponding to different applications if retraining the confidence engine on-the-fly is considered impractical.

Self-trained and manually trained call routing systems can be further analyzed with respect to average CA rates. In specific experiments, no manual transcriptions were available at the time the system was installed. This gives a lower bound on the performance attainable by self-training; adding manual transcriptions will increase the system performance up to the performance of the baseline system fully trained on manual transcriptions. The system is assumed to be first trained when one audio sample has been collected for each route and operates in reduced performance mode while collecting and automatically transcribing more data. Each subsequent re-training iteration i takes place at the time when $2^i$ sample utterances for each route are available. Re-training updates the system LM, Router and CE. The audio data collected since the last re-training is first recognized using a leave-one-out LM. The leave-one-out is a slightly less optimal bootstrapped LM for each of the applications that were analyzed but is more robust to new application data. A simplified LM adaptation procedure was used that performed a single recognition pass through the audio data, and the newly recognized text was appended to the text recognized in the previous iterations and was used for training the system LM and Router. In this way, the LM adaptation procedure does not have to re-process the entire audio set collected until the current training iteration and is much faster. The LM trained at iteration i–1, $LM_{i-1}$ and $Router_{i-1}$ are used to extract acoustic and NLU features from the newly acquired audio features, which in turn are used to train the new confidence engine $CE_i$.

Figure 8:
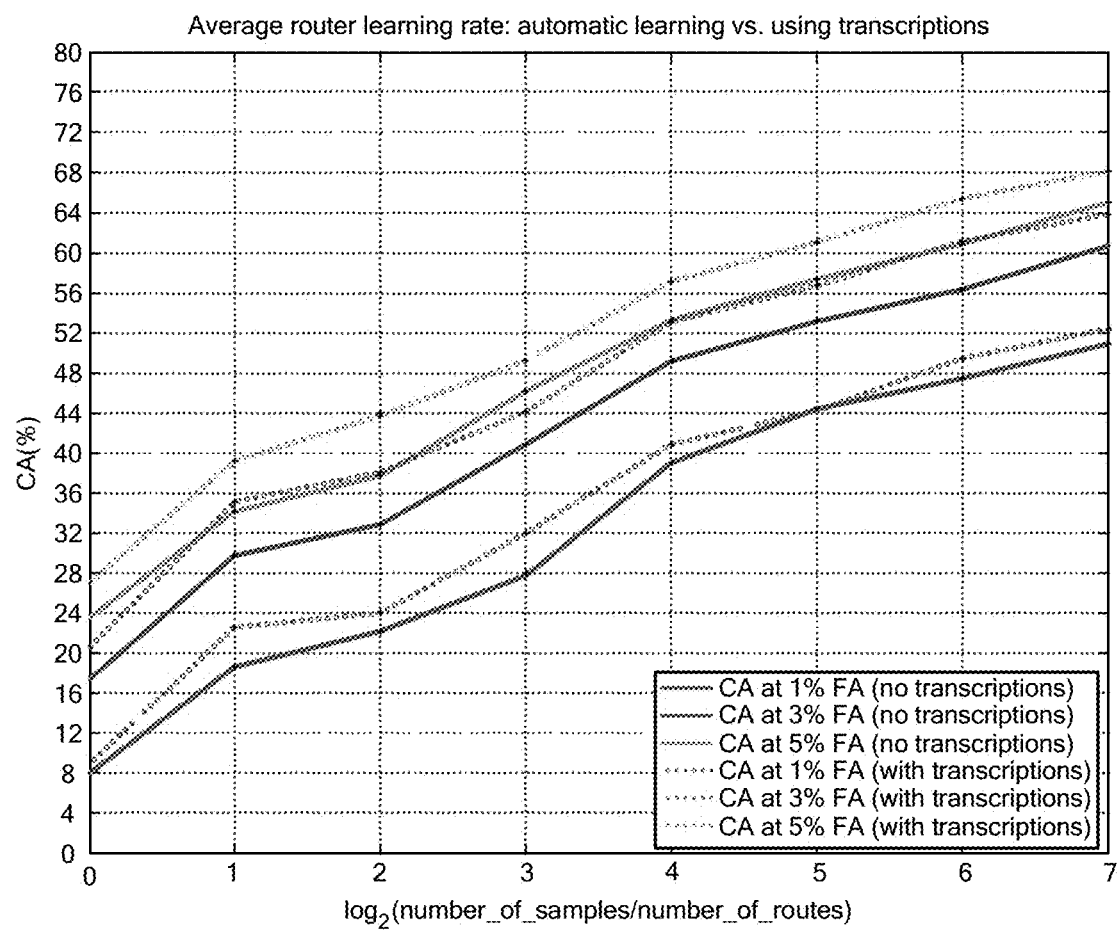
FIG. 8 shows learning curves for self-trained and manually trained semantic classification systems.

FIG. 8 plots the average CA rates (over 4 experimental applications) corresponding to FA rates of 1%, 3% and 5% as functions of the (log) size of the LM/Router training set. The curves corresponding to using manual transcriptions (dashed) are plotted along with the curves corresponding to automated transcriptions (solid lines). The following observations can be made:
  a) Average absolute loss in automation rate was about 4% due to using automated transcriptions for any size of the training set.
  b) Average absolute gain in automation rate was about 4% for doubling the size of the training set irrespective of whether manual or automatic transcriptions are used.
  c) Learning process did not saturate even at 128 sample utterances for each route.

Thus, a self-trained call routing system can start operating at about 20% automation rate (which may be higher or lower depending on the imposed FA rate) then add 4% in automation each time it is re-trained. The automation rate can go beyond 60% and the system trained on automated transcriptions can become as good as a system trained on manual transcriptions just by using a double amount of data.

There may be further strategies for improving the automation rate in the early stages of system deployment. For example, one strategy assumes that a large amount of application-specific audio has been recorded prior to the first system training, but it is neither transcribed nor labeled. The system can use this data to apply the full LM adaptation procedure (as described above) in the first training iteration, and thereby can employ a well-trained LM right from the start. To keep the training process fast and simple, the LM need not necessarily be further updated. The router however, is still trained at each iteration i on a set of $2^i$ automated transcriptions per route.

Figure 9:
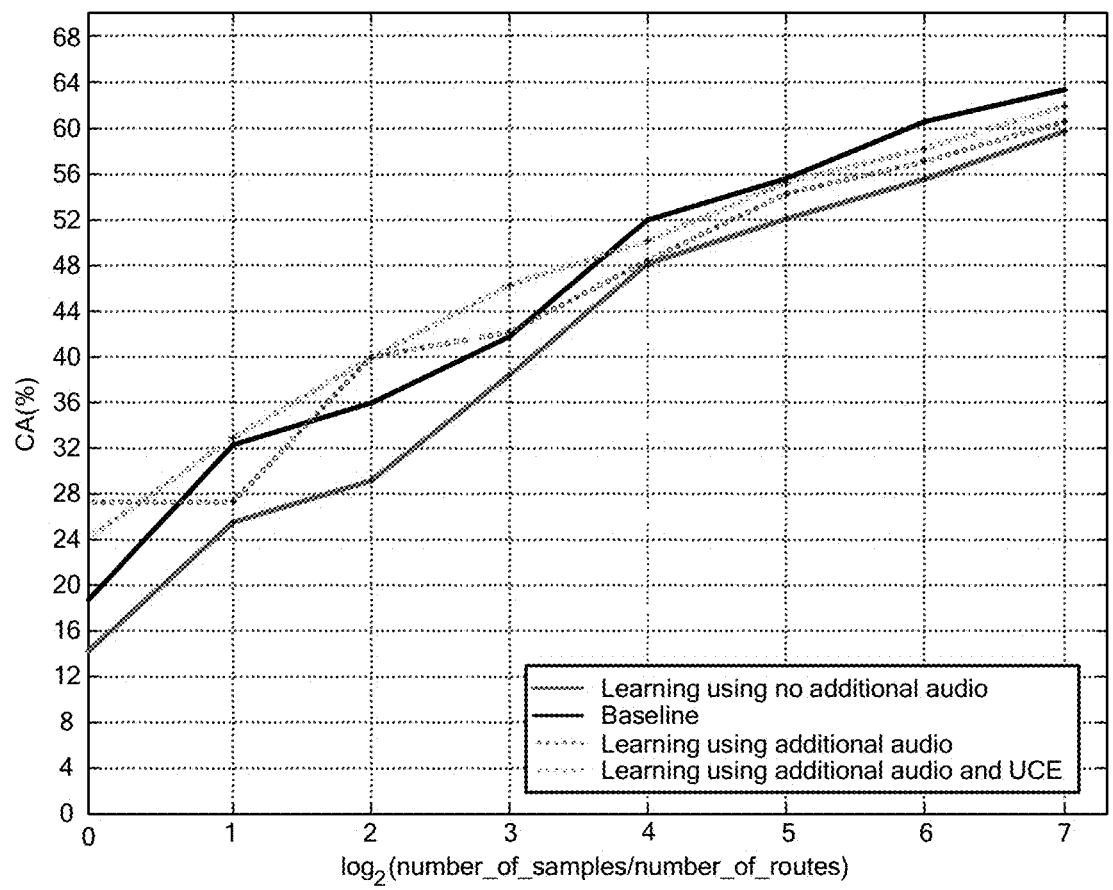
FIG. 9 shows learning curves for various self-trained and manually trained experiments.

Another automation improvement strategy can be based on using a Universal Confidence Engine (UCE) which is trained prior to the system deployment and is not updated in the first few system retraining iterations. FIG. 9 plots the average CA rates corresponding to FA=3% as functions of the (log) size of the router training set for four experimental UCEs that were trained in a leave-one-out fashion on three under-trained systems (using automated rather than manual transcriptions) using all data available for the corresponding applications. The baseline curve corresponding to using manual transcriptions is plotted along with the curves corresponding to: fully on-the-fly learning method (see above), using additional audio data to retrain the Router and CE, and using additional audio and a UCE. The following observations are made when fewer than 16 sample utterances per route are available:
  a) Using additional audio data increases the automation rate by 4-10% (absolute).
  b) Using a UCE along with additional audio data uniformly increases the automation rate by 8-10%, and the system can start operating at about 28% AR and increase it by 8% at each of the next three retraining iterations.
  c) Using a UCE and additional audio data performs consistently better than a baseline system whose Router/LM/CE are retrained at each iteration on similar amounts of manually transcribed data.

When more than 16 sample utterances per route are available, the system using a UCE and additional audio data halves the difference in automation between a manually trained system and a system which performs a single LM adaptation step. Therefore, a better adapted LM and a UCE account for about 2% of the automation rate.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

For example, a pseudo code representation of one specific approach for training a confidence engine from an under-trained system might be set forth as follows:

```
Process UndertrainedConfidenceEngineTraining
    operate under-trained semantic classification system on
        input speech utterances with manually assigned
        semantic labels
    train confidence engine on extracted feature data
```

A pseudo code representation of one specific approach for training a confidence engine from another existing application might be set forth as follows:

```
Process NewAppConfidenceEngineTraining
    operate semantic classification system on input speech
        utterances with manually assigned semantic labels
        to extract corresponding feature data
    train confidence engine for a different semantic
        classification application on extracted feature
        data
```

A pseudo code representation of one specific approach for call routing adaptation of a confidence engine might be set forth as follows:

```
Process ConfidenceEngineCallRouteAdapatation
    define call routes for specific call processing paths
```

-continued

```
perform initial router confidence training on initial
    training data
operate call routing system to assign input speech
    utterances to defined call routes
collect adaptation training data based on processed
    input speech utterances
re-perform router confidence training based on the
    adaptation training data
```

A pseudo code representation of one specific approach for training a call routing system during early deployment might be set forth as follows:

```
Process EarlyCallRoutingTraining
    define call routes for specific call processing paths
    perform first training from training data without in-
        domain manually transcribed training data and a
        large amount of un-transcribed in-domain data
    operate call routing system to assign input speech
        utterances to defined call routes
    collect adaptation training data based on manually
        processed input speech utterances
    automatically retrain call routing system based on
        adaptation training data
```

A pseudo code representation of one specific approach for training a call routing system during early deployment using a generic confidence engine might be set forth as follows:

```
Process GenericConfidenceEngineAdaptation
    define call routes for specific call processing paths
    train call routing system with generic confidence
        engine
    operate call routing system to assign input speech
        utterances to defined call routes
    collect adaptation training data based on manually
        processed input speech utterances
    automatically retrain call routing system based on
        adaptation training data
```

Another pseudo code representation of an approach for training a call routing system during early deployment using a generic confidence engine might be set forth as follows:

```
Process GenericEarlyCallRoutingTraining
    define call routes for specific call processing paths
    train call routing system with generic confidence
        engine from training data without in-domain
        manually transcribed training data and a large
        amount of un-transcribed in-domain data
    operate call routing system to assign input speech
        utterances to defined call routes
    collect adaptation training data based on manually
        processed input speech utterances
    automatically retrain call routing system based on
        adaptation training data
```

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer based method implemented using at least one hardware implemented processor for developing an automated speech input semantic classification system, the method comprising:
    using the at least one hardware implemented processor to perform the steps of:
        defining a set of semantic classifications for classification of input speech utterances, each semantic classification representing a specific semantic classification of the speech input;
        training the semantic classification system from training data, the training including a) generating a plurality of subset language models, each of the subset language models corresponding to a respective subset of the training data, and b) applying each of the plurality of subset language models to recognize a non-respective subset of the training data;
        operating the semantic classification system to assign input speech utterances to the defined semantic classifications;
        obtaining adaptation training data based on input speech utterances with manually assigned semantic labels from at least one source of already collected language data; and
        when the adaptation training data satisfies a pre-determined adaptation criteria, automatically retraining the semantic classification system based on the adaptation training data.

2. The method according to claim 1, wherein training the semantic classification system includes training a language model in an automatic speech recognition engine that converts the input speech utterances into representative text.

3. The method according to claim 1, wherein training the semantic classification system includes training a statistical semantic classifier that classifies text representing the input speech utterances according to one of the defined semantic classifications.

4. The method according to claim 1, wherein training the semantic classification system includes training a confidence engine that determines confidence scores based on acoustic features and natural language understanding (NLU) features to represent the likelihood of the input speech utterances being correctly classified with a defined semantic classification.

5. The method according to claim 1, wherein the training data includes in-domain automatically transcribed training data.

6. The method according to claim 1, wherein the training data includes manually transcribed training data from one or more other semantic classification systems in one or more different domains.

7. The method according to claim 1, wherein the semantic classification system is an automated call routing system.

8. A system for developing an automated speech input semantic classification system comprising:
at least one hardware implemented processor; and
a memory device operatively connected to the at least one processor;
wherein, responsive to execution of program instructions accessible to the at least one processor, the at least one processor is configured to:
defining a set of semantic classifications for classification of input speech utterances, each semantic classification representing a specific semantic classification of the speech input;
training the semantic classification system from training data, the training including a) generating a plurality of subset language models, each of the subset language models corresponding to a respective subset of the training data, and b) applying each of the plurality of subset language models to recognize a non-respective subset of the training data;
operating the semantic classification system to assign input speech utterances to the defined semantic classifications;
obtaining adaptation training data based on input speech utterances with manually assigned semantic labels from at least one source of already collected language data; and
when the adaptation training data satisfies a pre-determined adaptation criteria, automatically retraining the semantic classification system based on the adaptation training data.

9. The system according to claim 8, wherein training the semantic classification system includes training a language model in an automatic speech recognition engine that converts the input speech utterances into representative text.

10. The system according to claim 8, wherein training the semantic classification system includes training a statistical semantic classifier that classifies text representing the input speech utterances according to one of the defined semantic classifications.

11. The system according to claim 8, wherein training the semantic classification system includes training a confidence engine that determines confidence scores based on acoustic features and natural language understanding (NLU) features to represent the likelihood of the input speech utterances being correctly classified with a defined semantic classification.

12. The system according to claim 8, wherein the training data includes in-domain automatically transcribed training data.

13. The system according to claim 8, wherein the training data includes manually transcribed training data from one or more other semantic classification systems in one or more different domains.

14. The system according to claim 8, wherein the semantic classification system is an automated call routing system.

15. A computer program product encoded in a non-transitory computer-readable medium, which when executed by a computer causes the computer to perform the following operations:
defining a set of semantic classifications for classification of input speech utterances, each semantic classification representing a specific semantic classification of the speech input;
training the semantic classification system from training data, the training including a) generating a plurality of subset language models, each of the subset language models corresponding to a respective subset of the training data, and b) applying each of the plurality of subset language models to recognize a non-respective subset of the training data;
operating the semantic classification system to assign input speech utterances to the defined semantic classifications;
obtaining adaptation training data based on input speech utterances with manually assigned semantic labels from at least one source of already collected language data; and
when the adaptation training data satisfies a pre-determined adaptation criteria, automatically retraining the semantic classification system based on the adaptation training data.

16. The product according to claim 15, wherein training the semantic classification system includes training a language model in an automatic speech recognition engine that converts the input speech utterances into representative text.

17. The product according to claim 15, wherein training the semantic classification system includes training a statistical semantic classifier that classifies text representing the input speech utterances according to one of the defined semantic classifications.

18. The product according to claim 15, wherein training the semantic classification system includes training a confidence engine that determines confidence scores based on acoustic features and natural language understanding (NLU) features to represent the likelihood of the input speech utterances being correctly classified with a defined semantic classification.

19. The product according to claim 15, wherein the training data includes in-domain automatically transcribed training data.

20. The product according to claim 15, wherein the training data includes manually transcribed training data from one or more other semantic classification systems in one or more different domains.

21. The product according to claim 15, wherein the semantic classification system is an automated call routing system.

* * * * *